US012787033B2

(12) United States Patent
Zhang et al.

(10) Patent No.: US 12,787,033 B2
(45) Date of Patent: Nov. 3, 2026

(54) METHOD AND DEVICE FOR INDICATING RESOURCE COLLISION, AND COMPUTER READABLE STORAGE MEDIUM

(71) Applicant: GUANGDONG OPPO MOBILE TELECOMMUNICATIONS CORP., LTD., Dongguan (CN)

(72) Inventors: Shichang Zhang, Dongguan (CN); Zhenshan Zhao, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 379 days.

(21) Appl. No.: 18/416,825

(22) Filed: Jan. 18, 2024

(65) Prior Publication Data

US 2024/0155651 A1 May 9, 2024

Related U.S. Application Data

(63) Continuation of application No. PCT/CN2021/107461, filed on Jul. 20, 2021.

(51) Int. Cl.

| | |
|---|---|
| ***H04W 4/00*** | (2018.01) |
| ***H04L 1/1812*** | (2023.01) |
| ***H04W 28/20*** | (2009.01) |
| ***H04W 72/25*** | (2023.01) |

(52) U.S. Cl.

CPC ........... *H04W 72/25* (2023.01); *H04L 1/1812* (2013.01); *H04W 28/20* (2013.01)

(58) Field of Classification Search

CPC ...... H04W 72/25; H04W 28/20; H04W 72/40

See application file for complete search history.

(56) References Cited

U.S. PATENT DOCUMENTS

| | | | | |
|---|---|---|---|---|
| 2022/0030598 | A1 | 1/2022 | Li | |
| 2022/0303954 | A1* | 9/2022 | Hwang | H04W 72/0453 |
| 2023/0362739 | A1* | 11/2023 | Zhao | H04W 72/25 |

FOREIGN PATENT DOCUMENTS

| | | | |
|---|---|---|---|
| CN | 109691146 | A | 4/2019 |
| CN | 110139372 | A | 8/2019 |
| CN | 112235765 | A | 1/2021 |
| CN | 112751658 | A | 5/2021 |
| CN | 112840586 | A | 5/2021 |
| EP | 3926871 | A1 | 12/2021 |
| EP | 4280497 | A1 | 11/2023 |
| WO | 2020164433 | A1 | 8/2020 |
| WO | 20230000181 | A1 | 1/2023 |

OTHER PUBLICATIONS

International Search Report of the International Application No. PCT/CN2021/107461, mailed on Mar. 28, 2022, with English translation provided by WIPO.

(Continued)

*Primary Examiner* — Omoniyi Obayanju

(74) *Attorney, Agent, or Firm* — Ladas & Parry, LLP

(57) ABSTRACT

A resource collision indication method includes that: a first device whether to send first information indicating that a resource collision is likely to occur on a resource to be used by a second device. A resource collision indication device and a computer readable storage medium are also provided.

18 Claims, 5 Drawing Sheets

(56) References Cited

OTHER PUBLICATIONS

Written Opinion of the International Search Authority in the International Application No. PCT/CN2021/107461, mailed on Mar. 28, 2022, with English translation provided by WIPO.
3GPP TSG RAN WG1 #98bis R1-1910139, Chongqing, China, Oct. 14-20, 2019, Agenda Item: 7.2.4.5, Source: Fujitsu, Title: Discussion on physical layer procedure for NR V2X, Document for: Discussion/Decision.
3GPP TSG RAN WG1 #103-e R1-2009788, e-Meeting, Oct. 26-Nov. 13, 2020, Agenda item: 8.11.2.2, Source: Moderator (LG Electronics), Title: Feature lead summary for AI 8.11.2.2 Feasibility and benefits for mode 2 enhancements, Document for: Discussion and information.
3GPP TSG RAN WG1 Meeting #103-e R1-2007616, E-meeting, Oct. 26-Nov. 13, 2020, Agenda Item: 8.11.2.2, Source: Huawei, HiSilicon, Title: Inter-UE coordination in sidelink resource allocation, Document for: Discussion and Decision.
3GPP TSG RAN WG1 #103-e R1-2008190, e-Meeting, Oct. 26-Nov. 13, 2020, Agenda item: 8.11.2.2, Source: Samsung, Title: On Feasibility and Benefits for Mode2 Enhancements, Document for: Discussion and Decision.
3GPP TSG-RAN WG1 Meeting #103-e R1-2009073, e-Meeting, Aug. 17-28, 2020, Agenda Item: 8.11.2.2, Source: Ericsson, Title: Feasibility and benefits of mode 2 enhancements for inter-UE coordination, Document for: Discussion, Decision.
3GPP TSG RAN WG1 Meeting #103-e R1-2009273, Oct. 26-Nov. 13, 2020, Agenda item: 8.11.2.2, Source: Qualcomm Incorporated, Title: Reliability and Latency Enhancements for Mode 2, Document for: Discussion/Decision.
3GPP TSG RAN WG1 #103-e R1-2007689, e-Meeting, Oct. 26-Nov. 13, 2020, Source: vivo, Title: Discussion on mode 2 enhancements, Agenda Item: 8.11.2.2, Document for: Discussion and Decision.
3GPP TSG RAN WG1 Meeting #103-e R1-2007896, e-Meeting, Oct. 26-Nov. 13, 2020, Agenda Item: 8.11.2.2, Source: LG Electronics, Title: Discussion on feasibility and benefits for mode 2 enhancement, Document for: Discussion and decision.
First Office Action of the European patent application No. 21950446.1, issued on Feb. 6, 2025.
Second Office Action in the European application No. 21950446.1, issued on Sep. 23, 2025.
Lenovo et al: "Discussion on inter-UE coordination for Mode 2 enhancements", 3GPP Draft; R1-2104870, 3rd Generation Partnership Project (3GPP), Mobile Competence Centre; 650, Route Des Lucioles; F-06921 Sophia-Antipolis Cedex; France, vol. Ran WG1, No. e-Meeting; May 10, 2021-May 27, 2021, May 12, 2021 (May 12, 2021), XP052011091, p. 6-p. 9.
Supplementary European Search Report in the European patent application No. 21950446.1, mailed on Jul. 2, 2024.
Third Office Action of the corresponding European patent application No. 21950446.1, issued on Apr. 2, 2026.

* cited by examiner

METHOD AND DEVICE FOR INDICATING RESOURCE COLLISION, AND COMPUTER READABLE STORAGE MEDIUM

CROSS-REFERENCE TO RELATED APPLICATION

The present disclosure is a continued application of PCT application No. PCT/CN2021/107461 filed on Jul. 20, 2021, the disclosure of which is incorporated herein by reference in its entirety.

TECHNICAL FIELD

Embodiments of the present disclosure relate to the technical field of wireless communications, and in particular to a method and device for indicating resource collision, and a computer readable storage medium.

BACKGROUND

At present, in device to device (D2D) technology, two transmission modes are defined: one is that a terminal transmits data on a sidelink (SL) according to a resource allocated by a base station, where the base station can allocate a resource for single transmission or semi-static transmission for the terminal. The other is that the terminal randomly selects a transmission resource in a resource pool, or determines a candidate resource set according to the existing listening process, and then randomly selects a resource in the candidate resource set, and then carries out sidelink transmission.

The above second transmission mode may avoid interference between terminals to a certain extent, but there are still some problems such as hidden nodes, half-duplex restriction, exposing terminals, etc. Therefore, enhanced resource selection solutions are proposed: one is that on the basis of adopting the above second transmission mode for resource listening, a reference resource set may be sent from a terminal (UE-A) to another terminal (UE-B) to assist the UE-B in resource selection. The other is that the UE-A sends a resource collision indication to the UE-B to assist the UE-B in resource selection.

In the above second enhanced resource selection solution, one of the urgent problems to be solved at present is what conditions can the UE-A meet to send the above resource collision indication to the UE-B.

SUMMARY

Embodiments of the present disclosure provide a method and device for indicating resource collision, a computer readable storage medium, which can improve the overall performance of sidelink communication.

In a first aspect, an embodiment of the present disclosure provides a method for indicating resource collision, which includes that: a first device determines whether to send first information, where the first information indicates that a resource collision is likely to occur on a resource to be used by a second device.

In a second aspect, an embodiment of the present disclosure provides a device for indicating resource collision, which includes: a processor, configured to determine whether to send first information indicating a resource collision is likely to occur on a resource to be used by a second device.

In a third aspect, an embodiment of the present disclosure provides a computer readable storage medium having stored therein a computer program that, when executed by a computer, causes the computer to perform the method as described in the first aspect.

DETAILED DESCRIPTION

In order to make the object, technical solution and advantages of embodiments of the present disclosure more clearer, the technical solution of embodiments of the present disclosure will be clearly and completely described in conjunction with the accompanying drawings in embodiments of the present disclosure below, and it will be obvious that the described embodiments are part of embodiments of the present disclosure, but not all of them. Based on embodiments in the present disclosure, all other embodiments obtained by those ordinarily skilled in the art without making creative efforts fall within the scope of protection of the present disclosure.

The terms “comprising” and “having” and any variations thereof in the description, claims and above accompanying drawings of embodiments of the present disclosure are intended to cover non-exclusive inclusion, for example, processes, methods, systems, products, or devices that contain a series of steps or units do not need to be limited to those steps or units clearly listed, but may include other steps or units not explicitly listed or inherent to such processes, methods, products, or devices.

It should be understood that the expression of "indicating" in the embodiments of the present application may refer to "indicating directly" or "indicating indirectly", or may be indicative of an association. For example, A indicates B, which can mean that A directly indicates B, for example, B can be obtained through A. It can also mean that A indirectly indicates B, for example, A indicates C, and B can be obtained through C. It can also mean that there is an association between A and B.

In the embodiments of the present disclosure, the term "correspond" may mean that there is a direct correspondence or an indirect correspondence between the two, or there is an association relationship between the two, or may also be a relationship between indicating and being indicated, configuring and being configured, etc.

Before introducing the technical solution provided by embodiments of the present disclosure, the possible application scenarios of embodiments of the present disclosure are first explained.

Figure 1:
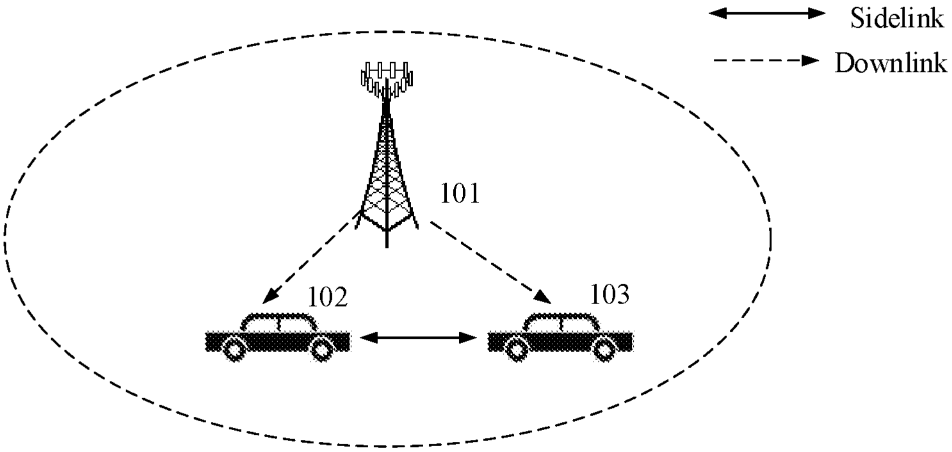
FIG. 1 is a first schematic diagram of an application scenario according to an embodiment of the present disclosure.

FIG. 1 is a first schematic diagram of an application scenario according to an embodiment of the present disclosure. The communication system illustrated in FIG. 1 includes a network device 101 and two terminal devices, namely a terminal device 102 and a terminal device 103, both of which are within the coverage of the network device 101. The network device 101 is communicatively connected with the terminal device 102 and the terminal device 103 respectively, and the terminal device 102 is communicatively connected to the terminal device 103.

In an example, the terminal device 102 may send a communication message to the terminal device 103 through the network device 101, and the terminal device 102 may also send a communication message directly to the terminal device 103. Here, the link for direct communication between the terminal device 102 and the terminal device 103 is referred to as a D2D link, and may also be referred to as a proximity service (ProSe) link or a sidelink. Transmission resources on the D2D link may be allocated by the network device. Since both the terminal device 102 and the terminal device 103 are within a coverage range of the network device 101, both the terminal device 102 and the terminal device 103 may perform sidelink communication based on the same sidelink configuration by receiving sidelink configuration signaling from the network device 101.

Figure 2:
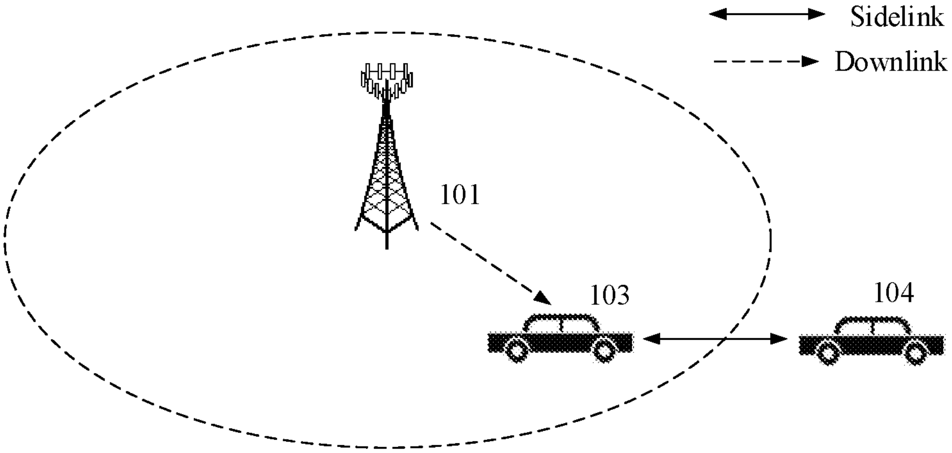
FIG. 2 is a second schematic diagram of an application scenario according to an embodiment of the present disclosure.

FIG. 2 is a second schematic diagram of an application scenario according to an embodiment of the present disclosure. The communication system illustrated in FIG. 2 likewise includes a network device 101 and two terminal devices. Unlike FIG. 1, the terminal device 103 is within the coverage of the network device 101, and the terminal device 104 is outside the coverage of the network device 101. The network device 101 is communicatively connected with the terminal device 103, and the terminal device 103 is communicatively connected to the terminal device 104.

In an example, the terminal device 103 may receive configuration information sent by the network device 101 and perform sidelink communication based on the configuration information. Since the terminal device 104 cannot receive the configuration information sent by the network device 101, the terminal device 104 may perform the sidelink communication based on pre-configuration information and information carried in the Physical Sidelink Broadcast Channel (PSBCH) transmitted by the terminal device 103.

Figure 3:
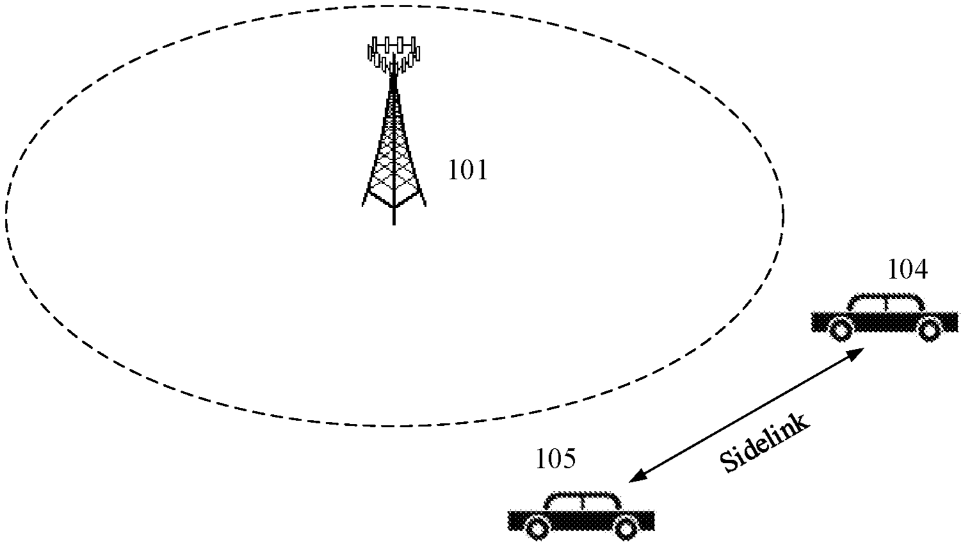
FIG. 3 is a third schematic diagram of an application scenario according to an embodiment of the present disclosure.

FIG. 3 is a third schematic diagram of an application scenario according to an embodiment of the present disclosure. As illustrated in FIG. 3, the terminal device 104 and the terminal device 105 are both outside the coverage of the network device 101. Both the terminal device 104 and the terminal device 105 may determine the sidelink configuration based on the pre-configuration information and perform the sidelink communication.

The terminal device involved in the embodiments of the present disclosure may also be referred to as a terminal, which may be a device with wireless transceiver function, which may be deployed on land, including indoor or outdoor, hand-held or vehicle-mounted; may be deployed on the water (such as ships, etc.); may also be deployed in the air (such as airplanes, balloons and satellites, etc.). The terminal device may be a user equipment (UE), where the UE includes a hand-held device, a vehicle-mounted device, a wearable device or a computing device with wireless communication function. In an example, the UE may be a mobile phone, a tablet computer, or a computer with wireless transceiver function. The terminal device may also be a virtual reality (VR) terminal device, an augmented reality (AR) terminal device, a wireless terminal in industrial control, a wireless terminal in unmanned driving, a wireless terminal in telemedicine, a wireless terminal in smart grid, a wireless terminal in smart city, a wireless terminal in smart home, etc. In embodiments of the present disclosure, an apparatus for realizing the functions of the terminal may be a terminal; or may also be an apparatus capable of supporting the terminal to realize the functions (such as a chip system), which may be installed in the terminal. In embodiments of the present disclosure, the chip system may be composed of chips or may include chips and other discrete devices.

The network device involved in embodiments of the present disclosure includes a base station (BS), which may be a device deployed in a radio access network and capable of wireless communicating with the terminal. Here, there may be many forms of the base station, such as macro base stations, micro base stations, relay stations and access points, etc. Exemplary, the base station involved in embodiments of the present disclosure may be a base station in 5th generation mobile networks (5G) or a base station in LTE, where the base station in 5G may also be referred to as a transmission reception point (TRP) or a gNB. In embodiments of the present disclosure, an apparatus for realizing the functions of the network device may be a network device; or may also be an apparatus capable of supporting the network device to realize the functions (such as a chip system), which may be installed in the network device.

The technical solution in embodiments of the present disclosure is mainly applied to communication systems based on new radio (NR) technology, such as 5G communication systems, NR-V2X, NR-vehicle to vehicle (NR-V2V) communication systems and the like. It can also be applied to another communication system as long as there is resource scheduling between entities in the communication system. For example, the technical solution in embodiments of the present disclosure may be applied to resource scheduling between the network device and the terminal device, resource scheduling between two terminal devices in which one terminal device undertakes the function of an accessed network, etc.

It should be noted that the system architecture and application scenarios described in embodiments of the present disclosure are intended to more clearly explain the technical solution of embodiments of the present disclosure, and do not constitute a limitation to the technical solution provided by embodiments of the present disclosure. Ordinarily skilled in the art can see that the technical solution provided by embodiments of the present disclosure is equally applicable to similar problems with the evolution of the network architecture and the emergence of new business scenarios.

Different from traditional cellular system in which communication data is received or sent through base station, D2D communication has higher frequency efficiency and lower transmission delay. The Internet of Vehicles system adopts terminal-to-terminal direct communication. In the 3rd generation partnership project (3GPP) protocol, two transmission modes are defined: a first transmission mode and a second transmission mode.

For the first transmission mode, transmission resources of the terminal device are allocated by the base station, and the terminal device performs data transmission on the sidelink according to the resources allocated by the base station. The base station may allocate resources for single transmission to the terminal device, or may allocate resources for semi-static transmission to the terminal device. Exemplary, in FIG. 1, the terminal device 102 is located within the coverage of the network device 101 which allocates transmission resources for sidelink transmission to the terminal device 102.

For the second transmission mode, the terminal device selects a resource in a resource pool for data transmission. Exemplary, the terminal device 102 illustrated in FIG. 1 may autonomously select transmission resources for sidelink transmission from a resource pool configured by the network. The terminal devices 104 and 105 illustrated in FIG. 3 are both located outside the coverage of the network device 101, and the terminal devices 104 and 105 may autonomously select transmission resources for sidelink transmission from a pre-configured resource pool.

In an embodiment, adopting the above second transmission mode for resource selection may include the following two operations:

In operation 1, the terminal device takes all available resources in a resource selection window as a resource set A.

If the terminal device sends data in certain slots within a listening window and is not listening, then all resources in the corresponding slots within a selection window are excluded. The terminal device determines the corresponding slots in the selection window by using a value set of a "resource reservation period" field in the used resource pool configuration.

If the terminal device listens a Physical Sidelink Control Channel (PSCCH) within the listening window, the terminal device measures a Reference Signal Received Power (RSRP) of the PSCCH or a RSRP of a Physical Sidelink Shared Channel (PSSCH) scheduled by the PSCCH. If the measured RSRP is greater than a SL-RSRP threshold, and the reserved resource is determined to be within the resource selection window based on resource reservation information in the sidelink control information transmitted in the PSCCH, then a corresponding resource is excluded from the resource set A. If the remaining resources in the resource set A are less than X % of the total resources before the resource exclusion for the resource set A, the SL-RSRP threshold is raised by 3 dB, and operation 1 is re-executed. The possible values of the above X are {20, 35, 50}, and the terminal device determines a parameter X from this set of values according to a priority of the data to be sent. Also, the above SL-RSRP threshold is related to a priority carried in the PSCCH listened by the terminal device and the priority of the data to be sent by the terminal device. The terminal device takes the remaining resources in the reference set A after resource exclusion as a candidate resource set.

In operation 2, the terminal device randomly selects several resources from the candidate resource set as transmission resources for initial transmission and retransmission.

In NR-V2X communication, X can generally refer to any device with wireless receiving and transmitting capabilities, including but not limited to slow-moving wireless apparatuses, fast-moving vehicle-mounted devices, network control nodes with wireless transmitting and receiving capabilities, etc. The NR-V2X communication supports unicast, multicast and broadcast transmission modes. For unicast transmission, the sending terminal sends data, and there is only one receiving terminal. For multicast transmission, the sending terminal sends data, and the receiving terminal is all terminals in a communication group or all terminals within a certain transmission distance. For broadcast transmission, the sending terminal sends data, and the receiving terminal is any one terminal around the sending terminal.

In NR-V2X communication, the second-stage Sidelink Control Information (SCI) is introduced.

The first-stage SCI (or referred to as the first sidelink control information) is carried in the PSCCH, and indicates information including the transmission resources of the PSSCH, reserved resource information, Modulation and Coding Scheme (MCS) level, priority and the like.

There are two second-stage SCI formats at present, i.e., SCI 2-A and SCI 2-B. SCI format 2-B is suitable for the multicast communication mode in which sidelink HARQ feedback is performed based on distance information; and SCI format 2-A is suitable for other scenarios, such as unicast, multicast and broadcast without sidelink HARQ feedback, unicast communication mode requiring sidelink HARQ feedback, multicast communication mode requiring ACK or NACK feedback, etc.

SCI format 2-A contains the following information:

HARQ processes—$\log_2 N_{process}$ bits, where $N_{process}$ represents the number of HARQ processes.

NDI—1 bit.

RV—2 bits.

Source ID—8 bits.

Destination ID—16 bits.

HARQ feedback enabled/disabled indicator—1 bit.

Cast type indicator—2 bits: 00 represents broadcast, 01 represents multicast, 10 represents unicast, and 11 is reserved.

CSI feedback request—1 bit.

SCI format 2-B is only indicative of multicast service transmission. Compared with SCI format 2-A, SCI format 2-B does not contain the cast type indicator field and the CSI feedback request field, but additionally contains the following two information fields:

Zone ID—12 bits.

Communication range requirement—4 bits.

Here, the zone ID is indicative of a zone corresponding to the geographical position of the sending UE, and the communication range requirement is indicative of a target communication range of the current transmission. In this multicast communication mode, if the receiving end UE within a communication range indicated by the communication range requirement of the sending end UE fails to successfully demodulate the PSSCH, then NACK should be fed back, and if the PSSCH is successfully demodulated, then no HARQ information should be fed back.

Figure 4:
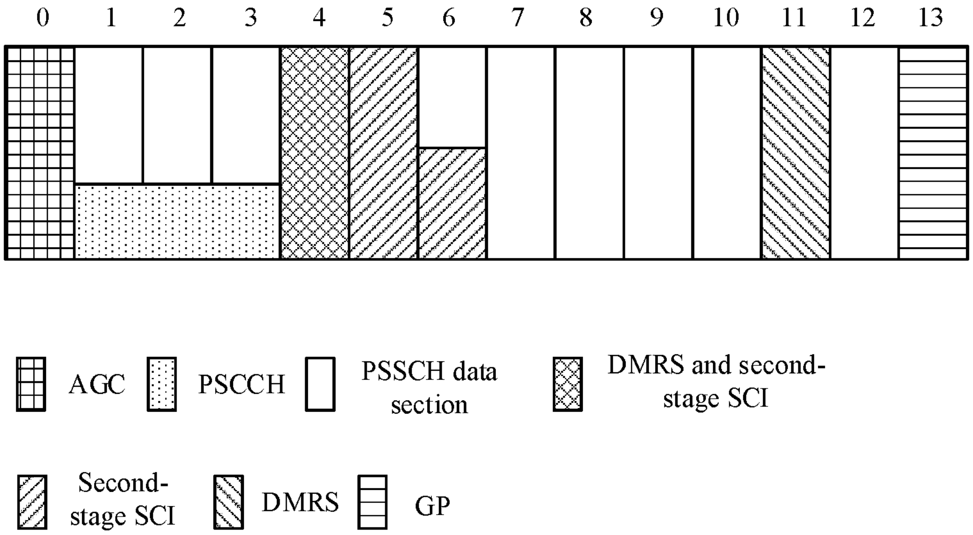
FIG. 4 is a first schematic diagram of a frame structure of sidelink communication according to an embodiment of the present disclosure.

FIG. 4 is a first schematic diagram of a frame structure of sidelink communication according to an embodiment of the present disclosure. As illustrated in FIG. 4, the PSCCH occupies 3 symbols, such as symbols 1, 2 and 3 in FIG. 4.

The DMRS of the PSSCH occupies symbols 4 and 11. The second-stage SCI is mapped from symbol 4 and is frequency division multiplexed with DMRS on the symbol 4. The second-stage SCI is mapped to symbols 4, 5 and 6, and the size of resources occupied by the second-stage SCI depends on the number of bits of the second-stage SCI.

NR-V2X communication needs to support automatic driving, so higher requirements are proposed for data interaction between vehicles, such as higher throughput, lower delay, higher reliability, larger coverage and more flexible resource allocation, etc. In order to improve the reliability of communication, the Physical Sidelink Feedback Channel (PSFCH) is introduced into NR-V2X.

In Release 16 version (R16) of NR-V2X, sequence based PSFCH is supported, which is referred to as PSFCH format 0. The transmission of this type of PSFCH occupies one physical resource block (PRB) in the frequency domain and one orthogonal frequency division multiplexing (OFDM) symbol in the time domain. The sequence type adopted is the same as Physical Uplink Control Channel (PUCCH) format 0. Within a resource pool, PSFCH resources are periodically configured with one, two, or four slots.

Figure 5:
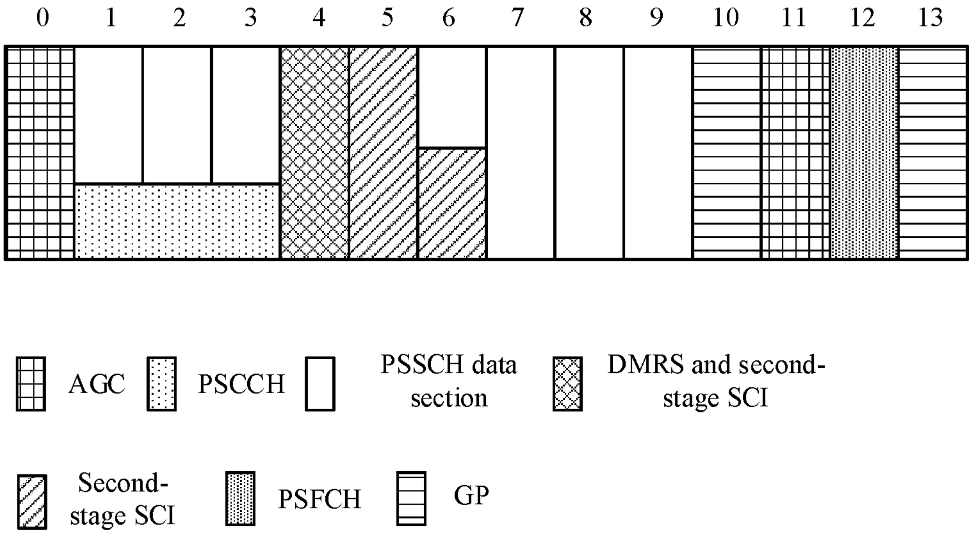
FIG. 5 is a second schematic diagram of a frame structure of sidelink communication according to an embodiment of the present disclosure.

FIG. 5 is a second schematic diagram of a frame structure of the sidelink communication according to an embodiment of the present disclosure. As illustrated in FIG. 5, in a slot configured with a PSFCH resource, the PSFCH resource is located on the last OFDM symbol available for sidelink transmission in the slot, such as symbol 12 in FIG. 5. However, in order for the UE to switch between transmission or reception, and to perform automatic gain control (AGC) adjustment, two OFDM symbols preceding the PSFCH symbol are allocated for transceiver switching and AGC adjustment, respectively. Consequently, no PSCCH and PSSCH are transmitted on the above three OFDM symbols. In NR-V2X, the PSFCH is only used to carry HARQ feedback information of just one bit.

The transmission resource of the PSFCH is determined according to the time-frequency position of the transmission resource of the PSSCH corresponding to the PSFCH. In NR-V2X, the following two PSFCH resource determination modes are supported, and the specific mode for determining the PSFCH resource is configured according to higher layer signaling.

Mode 1: the transmission resource of the PSFCH is determined based on a first sub-channel of a PSSCH frequency domain resource.

Mode 2: the transmission resource of the PSFCH is determined based on all sub-channels occupied by the PSSCH in the frequency domain.

For mode 1, since the transmission resource of the PSFCH is determined only based on the first sub-channel occupied by the PSSCH, therefore the number of feedback resources of the corresponding PSFCH is fixed regardless of how many sub-channels the PSSCH occupies. For mode 2, the number of transmission resources of the PSFCH is determined based on the number of sub-channels occupied by the PSSCH, therefore the more sub-channels occupied by the PSSCH, the more transmission resources of the PSFCH. Mode 2 is more suitable for a scenario requiring more sidelink HARQ feedback resources, such as a second type of sidelink HARQ feedback mode in multicast.

A corresponding PSFCH transmission resource set $$R_{PRB,CS}^{PSFCH}$$

may be determined based on the slot and sub-channel in which the PSSCH is transmitted. The indexes of PSFCH transmission resources in this resource set are determined first based on an order of resource blocks (RBs) from low to high, and then based on an order of cyclic shift (CS) from low to high. Further, in this resource set, the transmission resources of the PSFCH may be determined by the following formula:

$$(P_{ID} + M_{ID}) \bmod R_{PRB,CS}^{PSFCH}$$

Here, $P_{ID}$ represents ID information of the sending end, i.e., a source ID of the sending end UE carried in the sidelink control information (SCI). For unicast or NACK-only multicast sidelink HARQ feedback mode, $M_{ID}=0$; and for ACK/NACK multicast sidelink HARQ feedback mode, $M_{ID}$ represents an intra-group identifier of the receiving end UE configured at a higher layer.

In NR-V2X, PSFCH resources are configured through SL-PSFCH-Config signaling, where sl-PSFCH-Period-r16 is used to configure the period of PSFCH resources, sl-PSFCH-RB-Set-r16 is used to configure PRB available for PSFCH transmission on OFDM symbols where PSFCH resources are located, sl-NumMuxCS-Pair is used to configure the number of cyclic shifts of PFSCH sequences allowed within a PRB, sl-MinTimeGapPSFCH is used to configure a minimum time interval between the PSFCH and the PSSCH associated therewith, sl-PSFCH-HopID-r16 is used to configure frequency hopping ID of the PSFCH for determining a sequence of the PSFCH, and sl-PSFCH-CandidateResourceType is used to configure the way to determine PSFCH alternative resources.

Figure 6:
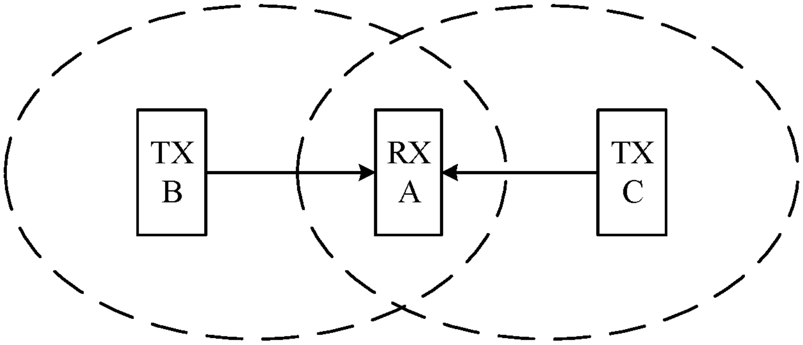
FIG. 6 is a schematic diagram of a scenario with a hidden node.

In the above second transmission mode, the terminal device randomly selects the transmission resource in the resource pool or selects the transmission resource according to the listening result. This resource selection mode may avoid the interference between the terminal devices to a certain extent, but there are still the following problems:

The first one is the hidden node problem. FIG. 6 is a schematic diagram of a scenario with a hidden node. As illustrated in FIG. 6, a sending terminal TX B selects a resource through listening and utilizes the resource to send sidelink data to a receiving terminal RX A. Since TX B and a sending terminal TX C are far away from each other and cannot listen the transmission from each other, TX B and TX C may select a same transmission resource, then the data sent by TX C will cause interference to the data sent by TX B.

The second one is the Half-duplex problem. When a terminal selects a transmission resource through listening, within a listening window, if the terminal sends the sidelink data on a certain slot, then the terminal cannot receive data sent by other terminals on this slot due to the limitation of half duplex, and there is no listening result. Therefore, when the terminal performs resource exclusion, all the resources corresponding to the slot within a selection window will be excluded to avoid interference with other terminals. Many resources that do not need to be excluded are excluded by the terminal due to the limitation of half duplex.

Figure 7:
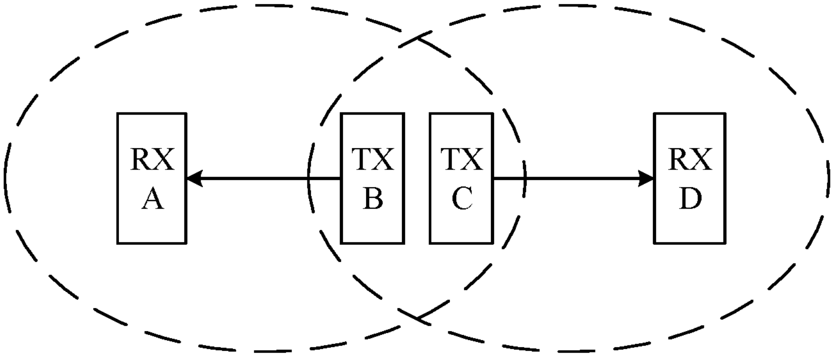
FIG. 7 is a schematic diagram of a scenario where a terminal is exposed.

The third one is terminal exposing problem. FIG. 7 is a schematic diagram of a scenario where a terminal is exposed. As illustrated in FIG. 7, a sending terminal TX B and a sending terminal TX C may both monitor each other, but a target receiving terminal RX A of TX B is far away from TX C, and a target receiving terminal RX D of TX C is far away from TX B. In this case, even if TX B and TX C use a same time-frequency resource, the reception of their respective target receiving terminals will not be affected. However, due to the close geographical position of TX B and TX C, the signal receiving power of the other party detected during the listening process may be very high, so both parties will choose orthogonal time-frequency resources, which may eventually lead to a decrease in resource utilization efficiency.

The fourth one is power consumption problem. In the above listening process, the terminal needs to continuously listening resources to determine which resources are available, which will consume a lot of energy. This is not a problem for a vehicle-mounted terminal, because the vehicle-mounted terminal has a power supply unit, but for a handheld terminal, excessive energy consumption will lead to the terminal running out of electricity quickly. Therefore, how to reduce the energy consumption of the terminal is also a problem to be considered in the resource selection process.

Due to the above problems in the resource selection process of the second transmission mode, an enhanced resource selection solution is proposed.

An enhanced resource selection solution is that, on the basis of resource listening adopted in the second transmission mode, a set of reference resources may also be sent from one terminal (UE-A) to another terminal (UE-B), and the set of reference resources is used to assist the UE-B in resource selection.

Here, the reference resource set may be determined by UE-A based on a resource listening result, a base station indication, or the like, or based on the detected sidelink control information (SCI). This reference resource set may be a resource set suitable for UE-B to use, and when UE-B selects a resource for sending sidelink data to the target receiving terminal, the resource may be preferentially selected from the reference resource set, thereby improving the reliability of receiving the sidelink data by the target receiving terminal. Alternatively, the reference resource set may be a resource set that is not suitable for UE-B to use, and UE-B avoids selecting resources in the reference resource set when selecting resources, thereby avoiding problems such as hidden terminals, half duplex limitations and the like. Here, the terminal undertaking UE-A function is referred to as a resource coordination terminal. UE-A may determine at what time the reference resource set is determined within which sending resource of UE-B according to an indication signaling from UE-B.

Another enhanced resource selection solution is that UE-A sends a resource collision indication to UE-B, and UE-B performs corresponding retransmission or resource reselection based on the indication.

Compared with the mode in which the terminal autonomously selects the transmission resources in the current second transmission mode, in the above enhanced resource allocation mode, the reliability of sidelink transmission may be improved by combining the auxiliary information sent by other terminals during the resource selection process of the terminal.

For the second enhanced resource selection solution, one of the urgent problems to be solved is what conditions can UE-A meet to send the resource collision indication to UE-B.

Aiming at the above problems, embodiments of the present disclosure provide a method and apparatus for indicating resource collision, a device, and a storage medium, which may be applied to the technical field of sidelink communications. Since the resource collision indication sent by UE-A to UE-B may indicate that a resource collision occurs on a resource already used by UE-B, or may indicate that a resource collision is likely to occur on a resource to be used by UE-B. Therefore for the above two conditions, UE-A needs to determine whether an initial condition for sending the resource collision indication to UE-B is met, and the initial condition may be more than one. If UE-A determines that at least one of the initial conditions is met, then UE-A sends the corresponding resource collision indication to UE-B, so that UE-B can know the resource collision that has occurred on the resource already used and the resource collision that is likely to occur on the resource to be used, thereby carrying out corresponding retransmission or resource reselection, and improving the reliability of sidelink data transmission.

The technical solution provided by embodiments of the present disclosure is described in detail by specific embodiments below. It should be noted that the technical solution provided by embodiments of the present disclosure may include some or all of the following contents, the following specific embodiments may be combined with each other, and the same or similar concepts or processes may not be repeated in some embodiments.

Figure 8:
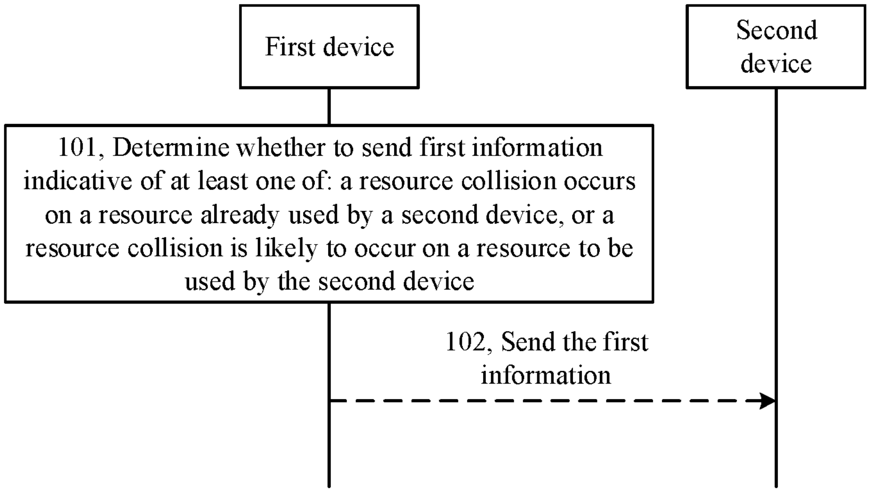
FIG. 8 is a first interactive schematic diagram of a method for indicating resource collision according to an embodiment of the present disclosure.

FIG. 8 is a first interactive schematic diagram of a method for indicating resource collision according to an embodiment of the present disclosure. As illustrated in FIG. 8, the method for indicating resource collision provided in the present embodiment includes the following operations.

In 101, a first device determines whether to send first information indicative of at least one of the following: a resource collision occurs on a resource already used by a second device, or a resource collision is likely to occur on a resource to be used by the second device.

In 102, the first device sends the first information to the second device. (optional)

In the present embodiment, the first device and the second device may be any two devices that had established a connection in the sidelink communication. The first device is a resource coordination device, for example, the first device is the above-mentioned UE-A and the second device is the above-mentioned UE-B.

The first information includes at least one of second information or third information. Here, the second information indicates that the resource collision occurs on a resource already used by the second device, and the third information indicates that the resource collision is likely to occur on a resource to be used by the second device.

In an optional example of the present embodiment, when the first device determines that the resource collision occurs on the resource already used by the second device, the first device sends the first information to the second device, where the first information includes the second information.

In an optional example of the present embodiment, when the first device determines that the resource collision is likely to occur on the resource to be used by the second device, the first device sends the first information to the second device, where the first information includes the third information.

In an optional example of the present embodiment, when the first device determines that the resource collision occurs on the resource already used by the second device, and the resource collision is likely to occur on the resource to be used by the second device, the first device sends the first information to the second device, where the first information includes the second information and the third information.

In an optional example of the present embodiment, the first information is carried on a physical sidelink feedback channel (PSFCH).

It should be noted that in the present embodiment, the resource collision may also be described as a resource conflict.

As can be seen from the above embodiments, the first information sent by the first device to the second device is the resource collision indication information, which may be the indication information indicating that the resource collision occurs on the resource already used by the second device, or may be the indication information indicating that the resource collision is likely to occur on the resource to be used by the second device. Hereinafter, the former is referred to as the post collision (PC) indication, and the latter is referred to as the future collision (FC) indication.

The above embodiments describe a method for indicating resource collision. By determining whether the resource collision occurs on the resource already used by the second device and/or whether the resource collision is likely to occur on the resource to be used by the second device, the first device may decide whether to send the first information indicating the resource collision to the second device. By means of the above method, the second device is assisted in performing corresponding retransmission or resource reselection, and resource collisions in sidelink communication are reduced, thus improving the reliability of sidelink data transmission.

On the basis of the above embodiments, how the first device determines that the resource collision occurs on the resource already used by the second device will be described in detail in conjunction with the specific embodiments. Here, embodiment illustrated in FIG. 9 is for the above PC indication, that is, how the first device determines whether to send the PC indication to the second device, while the embodiment illustrated in FIG. 10 is for the above FC indication, that is, how the first device determines whether to send the FC indication to the second device.

Figure 9:
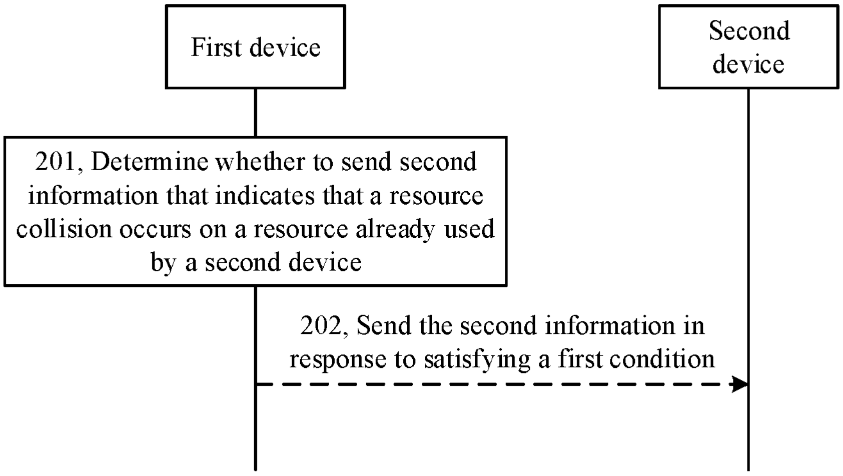
FIG. 9 is a second interactive schematic diagram of a method for indicating resource collision according to an embodiment of the present disclosure.
Figure 10:
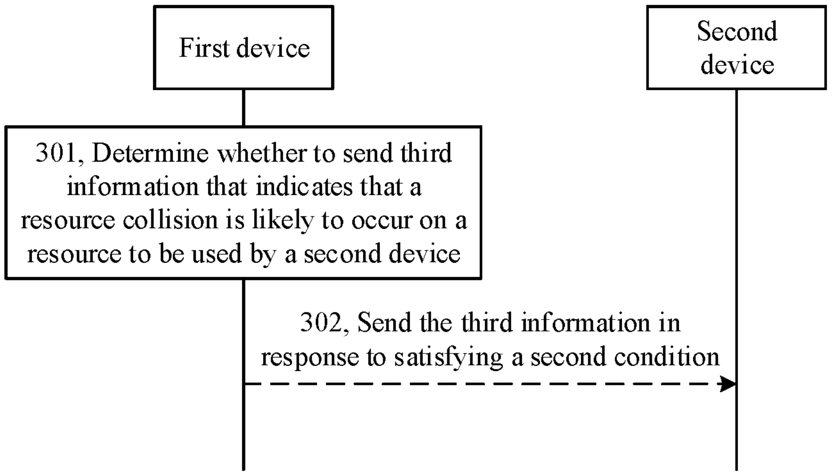
FIG. 10 is a third interactive schematic diagram of a method for indicating resource collision according to an embodiment of the present disclosure.

FIG. 9 is a second interactive schematic diagram of a method for indicating resource collision according to an embodiment of the present disclosure. As illustrated in FIG. 9, the method for indicating resource collision of the present embodiment includes the following operations.

In 201, a first device determines whether to send second information that indicates that a resource collision occurs on a resource already used by a second device.

In 202, in response to satisfying a first condition, the first device sends the second information to the second device. (optional)

In the present embodiment, if it is determined that the first device satisfies the first condition, then the first device determines to send the second information to the second device. Here, the first condition includes that the resource collision has occurred on the resource already used by the second device.

In an optional example of the present embodiment, the first condition includes: a time domain position at which a target receiving terminal of the second device sends sidelink information is the same as a time domain position of the resource already used by the second device. That is, the first device sends the second information to the second device when determining that the target receiving terminal of the second device sends the sidelink information in the slot where the resource already used by the second device is located.

In an optional example of the present embodiment, the first condition includes at least one of the following conditions:

Condition 1: (a) the first device (e.g., the above UE-A) receives a second-stage SCI format 2-B sent by the second device (e.g., the above UE-B) in slot n;

(b) The value of the HARQ feedback enabled/disabled indicator field in the second-stage SCI format 2-B sent by the second device is 1;

(c) The first device receives the second-stage SCI format 2-B sent by at least one other device (e.g., UE-C, UE-D, etc.) other than the second device in slot n, and a zone corresponding to the zone ID indicated in the second-stage SCI format 2-B is within the communication range indicated by the second-stage SCI format 2-B sent by the second device, where the communication range is determined based on the zone ID and the communication range requirement field indicated in the second-stage SCI format 2-B sent by the second device.

It should be noted that in (b), the value of the HARQ feedback enabled/disabled indicator field in the second-stage SCI format 2-B sent by the second device being 1 represents that: the HARQ feedback of the second device is activated/enabled, that is, other devices receiving the transmission of the second device need to send HARQ feedback information to the second device. The value of the HARQ feedback enabled/disabled indicator field in the second-stage SCI format 2-B sent by the second device being 0 represents that: the HARQ feedback of the second device is deactivated/disabled, that is, other devices receiving the transmission of the second device do not need to send HARQ feedback information to the second device.

It should be noted that the zone indicated in the second-stage SCI format 2-B may be understood as a domain in geographic space, for example, the zone indicated in the second-stage SCI format 2-B sent by UE-C may be understood as the geographic space range within which UE-C is located.

Condition 2: (a) the first device (e.g., the above UE-A) receives a second-stage SCI format 2-B sent by the second device (e.g., the above UE-B) in slot n;

(b) The value of the HARQ feedback enabled/disabled indicator field in the second-stage SCI format 2-B sent by the second device is 1;

(c) The first device receives the second-stage SCI (including a second-stage SCI of 2-A format or 2-B format) sent by at least one other device (e.g., UE-C, UE-D, etc.) other than the second device in slot n, and the value of the 8 least significant bits (LSB) of the destination ID field indicated in the second-stage SCI is the same as the value of the source ID field (8 bits) indicated in the second-stage SCI format 2-B sent by the second device. Exemplary, taking the second device as a UE-B and at least one other device other than the second device as a UE-C, the above (c) means that the target receiving end of UE-C is UE-B.

As can be seen from the above description of conditions, if at least one of condition 1 or condition 2 is satisfied, then the first device may determine that a resource collision has occurred on a resource already used by the second device.

In an optional example of the present embodiment, in response to satisfying at least one of the first conditions, the first device may determine whether to send the second information based on a capability of the first device to send the PSFCH.

In an optional example of the present embodiment, in response to satisfying at least one of the first conditions, if the first device does not need to receive, on a symbol where the PSFCH is located, a hybrid automatic retransmission request (HARQ) feedback for the physical sidelink shared channel (PSSCH) transmitted by the first device, and the number of PSFCHs needed to be transmitted by the first device on the symbol where the PSFCH is located, for carrying the HARQ feedback of the PSSCH received by the first device does not exceed the capability of the first device to transmit the PSFCH, the first device sends the second information to the second device.

In an optional example of the present embodiment, when the first device determines that a resource collision occurs on resources used by multiple second devices, the first device sends the second information includes that: the first device sends the second information to at least one of the multiple second devices.

In an optional example of the present embodiment, the first device sending the second information to the at least one of the multiple second devices is determined by the capability of the first device to transmit the PSFCH. That is, if the first device determines that the resource collision has occurred on the resources used by the multiple second devices, then the first device may determine, according to its own capability, to which one or more of second devices a resource collision indication is sent.

In an optional example of the present embodiment, the first device sends the second information to the at least one of the multiple second devices based on a priority of the PSSCH already received by the first device. That is, if the first device determines that the resource collision has occurred on the resources used by the multiple second devices, then the first device may determine, based on priorities of the received PSSCHs, to which one or several second devices with resource collision a resource collision indication is sent.

In an optional example of the present embodiment, a time-frequency domain resource for the second information sent by the first device to the second device is the same as a time-frequency domain resource for the HARQ feedback of a PSSCH transmitted by the first device to the second device.

In an optional example of the present embodiment, the first device sends the second information (i.e., PC indication, PC PSFCH for short) to the second device through the PSFCH.

The above embodiments describe a resource collision indication method. The first device may determine whether the resource collision occurs on the resource already used by the second device through the first condition, and in response to satisfying the first condition, the first device sends the second information for indicating resource collision to the second device. By means of the method, the second device is assisted in performing corresponding retransmission or resource reselection, and resource collisions in sidelink communication are reduced, thereby improving the reliability of sidelink data transmission.

FIG. 10 is a third interactive schematic diagram of a method for indicating resource collision according to an embodiment of the present disclosure. As illustrated in FIG. 10, the resource collision indication method of the present embodiment includes the following operations.

In 301, a first device determines whether to send third information that indicates that a resource collision is likely to occur on a resource to be used by a second device.

In 302, in response to satisfying a second condition, the first device sends the third information to the second device. (optional)

In the present embodiment, if it is determined that the first device satisfies the second condition, then the first device determines to send the third information to the second device. Here, the second condition includes that the resource collision is likely to occur on the resource to be used by the second device. That is, when the first device determines that the resource collision is likely to occur on the resource to be used by the second device, the first device sends the third information to the second device.

In an optional example of the present embodiment, the second condition includes at least one of the following conditions:

Condition 1: the first device (e.g., the above UE-A) receives sidelink transmissions of the second device (e.g., the above UE-B) and a target receiving terminal of the second device (e.g., UE-C, UE-D, etc.) in a same slot n, and the second device and the target receiving terminal of the second device reserve resources on the same slot.

Condition 2: the first device fails to successfully receive sidelink transmission of the second device, and the resource collision is likely to occur on a reserved resource for the second device.

Condition 1 and condition 2 of the second conditions are summarized in view of the resource collision being likely to occur on the resource to be used by the second device. For condition 1 and condition 2, several sub-conditions are included respectively, as described below.

In an optional example of the present embodiment, the second condition includes at least one of the following conditions:

Condition a: the first device (e.g., the above UE-A) receives a second-stage SCI sent by the second device (e.g., UE-B) in the slot n, and the first device determines itself as a target receiving terminal of the second-stage SCI and the PSSCH associated with the second-stage SCI based on a destination ID indicated in the second-stage SCI; the first device fails to successfully decode the PSSCH; and the first device performs pre-emption confirmation for the next resource for retransmission of the same transport block (TB) reserved by the first-stage SCI associated with the second-stage SCI, and determines that the pre-emption has occurred on the resource.

Condition b: the first device receives the second-stage SCI sent by the second device in the slot n, and the first device determines itself as the target receiving terminal of the second-stage SCI and the PSSCH associated with the second-stage SCI based on the destination ID indicated in the second-stage SCI; the first device fails to successfully decode the PSSCH; and the first device performs pre-emption confirmation for the resource reserved by the first-stage SCI associated with the second-stage SCI, and determines that the pre-emption has occurred on at least one of the resources.

Condition c: the first device receives the second-stage SCI format 2-B sent by the second device in the slot n; the first device receives the second-stage SCI format 2-B sent by at least one other device (such as UE-C, UE-D, etc.) other than the second device in the slot n, the zone corresponding to the Zone ID indicated in the second SCI format 2-B is within the communication range indicated by the second-stage SCI format 2-B sent by the second device; the next resource for the same TB transmission reserved by the first-stage SCI sent by the second device is in the slot m, and the first-stage SCI sent by at least one other device other than the second device in the slot n also reserves the resource in the slot m.

Herein, the communication range may be determined based on the Zone ID and the Communication range requirement field indicated in the second-stage SCI format 2-B sent by the second device.

Condition d: the first device receives the second-stage SCI format 2-B sent by the second device in the slot n; the first device receives the second-stage SCI format 2-B sent by at least one other device other than the second device in the slot n, the zone corresponding to the Zone ID indicated in the second-stage SCI format 2-B is within the communication range indicated by the second-stage SCI format 2-B sent by the second device; and at least one of resources reserved by first-stage SCI sent by the second device and at least one other device other than the second device in slot n is in the same slot.

Condition e: the first device receives the second-stage SCI sent by the second device in the slot n; the first device receives the second-stage SCI sent by at least one other device other than the second device in the slot n, the value of the 8 LSBs of the Destination ID field indicated in the second-stage SCI is the same as the value of the Source ID field indicated in the second-stage SCI sent by the second device; the next resource for the same TB transmission reserved by the first-stage SCI sent by the second device is in the slot m, and the first-stage SCI sent by at least one other device other than the second device in the slot n also reserves the resource in the slot m.

Condition f: the first device receives the second-stage SCI sent by the second device in the slot n; the first device receives the second-stage SCI sent by at least one other device other than the second device in the slot n, the value of the 8 LSBs of the Destination ID field indicated in the second-stage SCI is the same as the value of the Source ID field indicated in the second-stage SCI sent by the second device; and at least one of resources reserved by first-stage SCI sent by the second device and at least one other device other than the second device in slot n is in the same slot.

It is noted that in the present embodiment, the conditions a and b are all the sub-conditions of the condition 2 of the above second conditions, and the conditions c, d, e and f are all the sub-conditions of the condition 1 of the above second conditions.

In an optional example of the present embodiment, the first device sends the third information (i.e., FC indication, FC PSFCH for short) to the second device through the PSFCH.

In an optional example of the present embodiment, the third information includes at least one PSFCH sequence, each PSFCH sequence indicative of at least one of the following information:

A HARQ feedback for the PSSCH transmitted by the second device in the slot n;

Whether a resource collision occurs on the resource reserved by the second device; or Whether a resource collision occurs on the next resource for the same TB retransmission reserved by the second device.

The contents of the third information are described in detail in combination with several possible implementations.

In a possible implementation, a time domain position of the third information is the same as a time domain position of the PSFCH carrying the HARQ feedback of the PSSCH transmitted by the second device in the slot n.

Based on the above implementation, if the first device satisfies at least one of the above conditions a, c or e:

In the first case, if the second-stage SCI sent by the second device in the slot n is SCI format 2-B, and the value of the HARQ feedback enabled/disabled indicator field indicated in the second-stage SCI format 2-B is 1, then the frequency domain position of the PSFCH (i.e., FC PSFCH) used for the third information is the same as or different from the frequency domain position of the PSFCH carrying the HARQ feedback of the PSSCH transmitted by the second device in the slot n (HARQ PSFCH for short).

In the second case, if the second-stage SCI sent by the second device in the slot n is SCI format 2-A, and the value of the Cast type indicator field indicated in the second-stage SCI format 2-A is 11, and the value of the HARQ feedback enabled/disabled indicator field indicated in the second-stage SCI format 2-A is 1, then the frequency domain position of the PSFCH used for the third information is the same as or different from the frequency domain position of the PSFCH carrying the HARQ feedback of the PSSCH transmitted by the second device in the slot n. Here, the value of Cast type indicator field indicated in the second-stage SCI format 2-A being 11 represents that: the multicast sidelink transmission mode in which only NACK is fed back (that is, groupcast when HARQ-ACK information includes only NACK).

In the above two cases, if the frequency domain positions of FC PSFCH and HARQ PSFCH are the same, then the FC PSFCH and HARQ PSFCH are identical except for cyclic shifts of the FC PSFCH and HARQ PSFCH sequences being different. For example, the cyclic shift of HARQ PSFCH may be 0, and the cyclic shift of FC PSFCH may be 6. If the second device has detected the FC PSFCH, then the second device should understand that the PSSCH sent in the slot n needs to be re-transmitted (i.e., the HARQ feedback is NACK), and the next resource for re-transmission needs to be re-selected.

In the third case, if the second-stage SCI sent by the second device in the slot n is SCI format 2-A, and the value of the Cast type indicator field indicated in the second-stage SCI format 2-A is 01, and the value of the HARQ feedback enabled/disabled indicator field indicated in the second-stage SCI format 2-A is 1, then the frequency domain position of the PSFCH used for the third information is different from the frequency domain position of the PSFCH carrying the HARQ feedback of the PSSCH transmitted by the second device in the slot n. Here, the value of Cast type indicator field indicated in the second-stage SCI format 2-A being 01 represents that: the multicast sidelink transmission mode in which ACK or NACK is fed back (that is, groupcast when HARQ-ACK information includes ACK or NACK).

In the fourth case, if the second-stage SCI sent by the second device in the slot n is SCI format 2-A, and the value of the Cast type indicator field indicated in the second-stage SCI format 2-A is 10, and the value of the HARQ feedback enabled/disabled indicator field indicated in the second-stage SCI format 2-A is 1, then the frequency domain position of the PSFCH used for the third information is different from the frequency domain position of the PSFCH carrying the HARQ feedback of the PSSCH transmitted by the second device in the slot n. Here, the value of Cast type indicator field indicated in the second-stage SCI format 2-A being 10 represents that: the unicast sidelink transmission mode.

In the above two cases, the first device sends a specific PSFCH sequence on the PSFCH time-frequency resource. If the second device has detected the PSFCH sequence, then the second device should understand that the PSSCH transmitted in the slot n needs to be re-transmitted (i.e., the HARQ feedback is NACK), and the next resource for re-transmission needs to be re-selected.

Based on the above implementations, if the first device satisfies at least one of the above conditions b, d and f:

The first device may indicates the following through three different PSFCH sequences respectively: {a collision occurs on the first reserved resource, and no collision occurs on the second reserved resource}, {no collision occurs on the first reserved resource, and a collision occurs on the second reserved resource}, and {a collision occurs on the first reserved resource, and a collision occurs on the second reserved resource}. Alternatively, the first device may indicates the following through two different PSFCH sequences respectively: {a collision occurs on the first reserved resource, and no collision occurs on the second reserved resource}, {a collision occurs on the first reserved resource, and a collision occurs on the second reserved resource}. Herein, the above first reserved resource and the second reserved resource refer to the resources reserved by the second device. It should be noted that in general, the second device or the target receiving terminal of the second device will reserve at most two resources through SCI, therefore at most two resources reserved by the second device will be in the same slot as a resource reserved by the target receiving terminal of the second device.

If the second device receives any of the above PSFCH sequences, then the second device should consider that the PSSCH transmitted in the slot n should be retransmitted and the reserved resources with collisions should be reselected.

In a possible implementation, the time domain position of the third information and the time domain position of the PSFCH carrying the HARQ feedback of the PSSCH transmitted by the second device in the slot n are both in a slot m-b. Herein, m represents a slot in which a next resource for transmission of a same transmission block (TB) reserved by a first-stage SCI sent by the second device is located, and b represents a time for the second device to receive the PSFCH, process the PSFCH and prepare for sidelink retransmission, and the value of b is determined by the second device (i.e., the capability of the second device). Optionally, the second device notifies the first device of the value of b through physical layer or higher layer signaling.

Based on the above implementations, if the first device satisfies at least one of the above conditions a, c and e:

In the first case, if the second-stage SCI sent by the second device in the slot n is SCI format 2-B, and the value of the HARQ feedback enabled/disabled indicator field indicated in the second-stage SCI format 2-B is 1, then the first device sends two different PSFCH sequences in a slot n-b, respectively indicative of {the HARQ feedback of the PSSCH transmitted by the second device in the slot n is NACK, and no collision occurs on the next resource for the same TB retransmission reserved by the second device} and {the HARQ feedback of the PSSCH transmitted by the second device in the slot n is NACK, and a collision occurs on the next resource for the same TB retransmission reserved by the second device}.

In the second case, if the second-stage SCI sent by the second device in the slot n is SCI format 2-A, the value of the Cast type indicator field indicated in the second-stage SCI format 2-A is 11, and the value of the HARQ feedback enabled/disabled indicator field indicated in the second-stage SCI format 2-A is 1, then the first device sends two different PSFCH sequences in a slot n-b, respectively indicative of {the HARQ feedback of the PSSCH sent by the second device in the slot n is NACK, and no collision occurs on the next resource for the same TB retransmission reserved by the second device} and {the HARQ feedback of the PSSCH sent by the second device in the slot n is NACK, and a collision occurs on the next resource for the same TB retransmission reserved by the second device}.

In the third case, if the second-stage SCI sent by the second device in the slot n is SCI format 2-A, the value of the Cast type indicator field indicated in the second-stage SCI format 2-A is 01, and the value of the HARQ feedback enabled/disabled indicator field indicated in the second-stage SCI format 2-A is 1, then the first device sends three different PSFCH sequences in a slot n-b, respectively indicative of {the HARQ feedback of the PSSCH transmitted by the second device in the slot n is ACK}, {the HARQ feedback of the PSSCH transmitted by the second device in the slot n is NACK, and no collision occurs on the next resource for the same TB retransmission reserved by the second device} and {the HARQ feedback of the PSSCH transmitted by the second device in the slot n is NACK, and a collision occurs on the next resource for the same TB retransmission reserved by the second device}.

In the fourth case, if the second-stage SCI sent by the second device in the slot n is SCI format 2-A, the value of the Cast type indicator field indicated in the second-stage SCI format 2-A is 10, and the value of the HARQ feedback enabled/disabled indicator field indicated in the second-stage SCI format 2-A is 1, then the first device sends three different PSFCH sequences in a slot n-b, respectively indicative of {the HARQ feedback of the PSSCH transmitted by the second device in the slot n is ACK}, {the HARQ feedback of the PSSCH transmitted by the second device in the slot n is NACK, and no collision occurs on the next resource for the same TB retransmission reserved by the second device} and {the HARQ feedback of the PSSCH transmitted by the second device in the slot n is NACK, and a collision occurs on the next resource for the same TB retransmission reserved by the second device}.

In a possible implementation, the time domain position of the third information is in a slot m-b, where m represents a slot in which the next resource for transmission of the same TB reserved by the first-stage SCI sent by the second device is located, and b represents a time for the second device to receive the PSFCH, process the PSFCH and prepare for sidelink retransmission, and the value of b is determined by the second device. Optionally, the second device notifies the first device of the value of b through physical layer or higher layer signaling.

It should be noted that the above implementation describes the time domain position of the third information. The time domain position of the PSFCH carrying the HARQ feedback of the PSSCH transmitted by the second device in the slot n may be the same as the time domain position of the third information, or may be different from the time domain position of the third information, which is not limited herein.

Based on the above implementations, if the first device satisfies at least one of the above conditions a, c and e:

In the first case, if the second-stage SCI sent by the second device in the slot n is SCI format 2-B, and the value of the HARQ feedback enabled/disabled indicator field indicated in the second-stage SCI format 2-B is 1, then the first device sends one kind of PSFCH sequence in the slot n-b to indicate whether a collision occurs on the next resource for the same TB retransmission reserved by the second device.

In the second case, if the second-stage SCI sent by the second device in the slot n is format 2-A, the value of the Cast type indicator field indicated in the second-stage SCI format 2-A is 11, and the value of the HARQ feedback enabled/disabled indicator field indicated in the second-stage SCI format 2-A is 1, then the first device sends one kind of PSFCH sequence in the slot n-b to indicate whether a collision occurs on the next resource for the same TB retransmission reserved by the second device.

In the third case, if the second-stage SCI sent by the second device in the slot n is SCI format 2-A, the value of the Cast type indicator field indicated in the second-stage SCI format 2-A is 01, and the value of the HARQ feedback enabled/disabled indicator field indicated in the second-stage SCI format 2-A is 1, then the first device sends one kind of PSFCH sequence in the slot n-b to indicate whether a collision occurs on the next resource for the same TB retransmission reserved by the second device.

In the fourth case, if the second-stage SCI sent by the second device in the slot n is SCI format 2-A, the value of the Cast type indicator field indicated in the second-stage SCI format 2-A is 10, and the value of the HARQ feedback enabled/disabled indicator field indicated in the second-stage SCI format 2-A is 1, then the first device sends one kind of PSFCH sequence in the slot n-b to indicate whether a collision occurs on the next resource for the same TB retransmission reserved by the second device.

Based on the above implementations, if the first device satisfies at least one of the above conditions b, d and f:

The first device may indicate the following through three different PSFCH sequences respectively: {a collision occurs on the first reserved resource, and no collision occurs on the second reserved resource}, {no collision occurs on the first reserved resource, and a collision occurs on the second reserved resource}, and {a collision occurs on the first reserved resource, and a collision occurs on the second reserved resource}. Alternatively, the first device may indicate the following through two different PSFCH sequences respectively: {a collision occurs on the first reserved resource, and no collision occurs on the second reserved resource}, {a collision occurs on the first reserved resource, and a collision occurs on the second reserved resource}. Herein, the above first reserved resource and the second reserved resource refer to the resources reserved by the second device.

Optionally, if the first device is to send the PSFCH indicative of a resource collision in the slot m-b, then the first device does not send NACK feedback for the PSSCH transmitted by the second device in the slot n.

The above several implementations are summarized below:

In some embodiments, the time domain position of the third information is the same as the time domain position of the PSFCH carrying the HARQ feedback of the PSSCH transmitted by the second device in the slot n. The frequency domain position of the third information is the same as or different from the frequency domain position of the PSFCH carrying the HARQ feedback of the PSSCH transmitted by the second device in the slot n.

In some embodiments, the time domain position of the third information is different from the time domain position of the PSFCH carrying the HARQ feedback of the PSSCH transmitted by the second device in the slot n. The frequency domain position of the third information is different from the frequency domain position of the PSFCH carrying the HARQ feedback of the PSSCH transmitted by the second device in the slot n.

The above embodiments describe a resource collision indication method. The first device may determine whether the resource collision occurs on the resource to be used by the second device through the second condition, and in response to satisfying the second condition, the first device sends the third information for indicating the resource collision to the second device. By means of the method, the second device is assisted in performing corresponding retransmission or resource reselection, and resource collisions of sidelink communication are reduced, thereby improving the reliability of sidelink data transmission.

Figure 11:
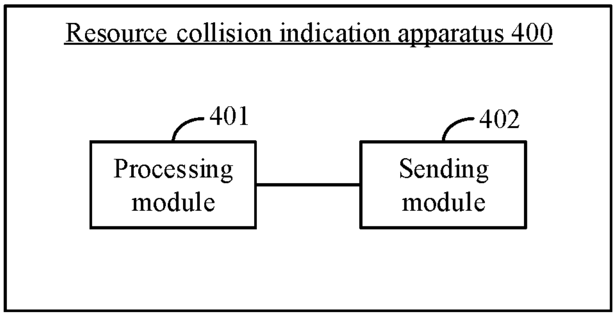
FIG. 11 is a structural schematic diagram of an apparatus for indicating resource collision according to an embodiment of the present disclosure.

FIG. 11 is a structural schematic diagram of an apparatus for indicating resource collision according to an embodiment of the present disclosure. As illustrated in FIG. 11, the resource collision indication apparatus 400 of the present embodiment includes: a processing module 401 and a sending module 402.

The processing module 401 is configured to determine whether to send first information indicative of at least one of: a resource collision occurs on a resource already used by a second device, or a resource collision is likely to occur on a resource to be used by the second device.

In an optional embodiment of the present disclosure, the first information includes at least one of second information or third information. Herein, the second information indicates that the resource collision occurs on the resource already used by the second device, and the third information indicates that the resource collision is likely to occur on the resource to be used by the second device.

In an optional embodiment of the present disclosure, the first information is carried on a physical sidelink feedback channel (PSFCH).

In an optional embodiment of the present disclosure, the first information includes the second information. The processing module 401 is specifically configured to, in response to satisfying a first condition, determine to send the second information. The first condition includes that the resource collision occurs on the resource already used by the second device.

In an optional embodiment of the present disclosure, the first condition includes the following:

A time domain position of at which a target receiving terminal of the second device sends sidelink information is the same as a time domain position of the resource already used by the second device.

In an optional embodiment of the present disclosure, the first information includes the second information. The processing module 401 is specifically configured to, in response to satisfying the first condition, determine whether to send the second information according to a capability of the first device to transmit the PSFCH.

In an optional embodiment of the present disclosure, the first information includes the second information. In response to satisfying the first condition, when the first device does not need to receive, on a symbol where the PSFCH is located, a hybrid automatic retransmission request (HARQ) feedback for the physical sidelink shared channel (PSSCH) transmitted by the first device, and the number of PSFCHs needed to be transmitted by the first device, on the symbol where the PSFCH is located, for carrying the HARQ feedback of the PSSCH received by the first device does not exceed the capability of the first device to transmit the PSFCH, the sending module 402 is configured to send the second information.

In an optional embodiment of the present disclosure, when the processing module 401 determines that the resource collision occurs on resources used by multiple second devices, the sending module 402 is specifically configured to send the second information to at least one of the multiple second devices.

In an optional embodiment of the present application, the sending module 402 is specifically configured to send the second information to the at least one of the multiple second devices based on a priority of the PSSCH received by the first device.

In an optional embodiment of the present disclosure, a time-frequency domain resource for the second information is the same as a time-frequency domain resource for the HARQ feedback of the PSSCH transmitted by the first device to the second device.

In an optional embodiment of the present disclosure, the first information includes the third information. The processing module 401 is specifically configured to, in response to satisfying a second condition, determine to send the third information. The second condition includes that the resource collision is likely to occur on the resource to be used by the second device.

In an optional embodiment of the present disclosure, the second condition includes at least one of the following:

Condition 1: the first device receives sidelink transmissions from the second device and a target receiving terminal of the second device in a same slot n, and the second device and the target receiving terminal of the second device reserve resources in a same slot.

Condition 2: the first device fails to successfully receive sidelink transmission from the second device, and the resource collision is likely to occur on the resource reversed by the second device.

In an optional embodiment of the present disclosure, the time domain position of the third information is the same as the time domain position of the PSFCH carrying the HARQ feedback of the PSSCH transmitted by the second device in the slot n.

In an optional embodiment of the present disclosure, the frequency domain position of the third information is the same as or different from the frequency domain position of the PSFCH carrying the HARQ feedback of the PSSCH transmitted by the second device in the slot n.

In an optional embodiment of the present disclosure, the time domain position of the third information and the time domain position of the PSFCH carrying a HARQ feedback of a PSSCH transmitted by the second device in a slot n are both in a slot m-b, here m represents a slot in which a next resource for transmission of a same transmission block (TB) reserved by a first-stage SCI sent by the second device is located, and b represents a time for the second device to receive the PSFCH, process the PSFCH and prepare for sidelink retransmission.

In an optional embodiment of the present disclosure, the time domain position of the third information is in the slot m-b, here m represents a slot in which a next resource for transmission of a same TB reserved by a first-stage SCI sent by the second device is located, and b is a time for the second device to receive the PSFCH, process the PSFCH and prepare for sidelink retransmission.

In an optional embodiment of the present disclosure, the third information includes at least one PSFCH sequence, each PSFCH sequence indicates at least one of the following:

A HARQ feedback for a PSSCH transmitted by the second device in a slot n.

Whether a resource collision occurs on a resource reserved by the second device.

Whether a resource collision occurs on a next resource for a same TB retransmission reserved by the second device.

The resource collision indication apparatus provided by embodiments of the present disclosure is used for executing the technical solution executed by the first device in the aforementioned method embodiments, and its realization principle and technical effect are similar, which will not be repeated here.

It should be noted that the division of each module of the above resource collision indication apparatus is only a logical function division, which can be completely or partially integrated into a physical entity or physically separated in actual implementation. And these modules may all be implemented in the form of software calling through processing elements; may also be implemented in the form of hardware. Some modules may also be implemented in the form of software called by processing elements, and some modules may be implemented in the form of hardware. For example, the processing module may be a separate processing element, or may be integrated in a certain chip of the above apparatus, in addition, may also be stored in the memory of the above apparatus in the form of program code, and the function of the above module may be called and executed by a certain processing element of the above apparatus. The implementation of other modules is similar. In addition, all or part of these modules may be integrated or may be implemented independently. The processing element described herein may be an integrated circuit with signal processing capability. In implementation, the respective steps or modules of the above method may be accomplished by integrated logic circuits of hardware in the processor element or by instructions in the form of software.

For example, the above modules may be at least one integrated circuits configured to implement the above methods, such as: at least one application specific integrated circuits (ASIC), or at least one microprocessor (i.e., a digital signal processor, DSP), or one or more field programmable gate arrays (FPGA), etc. As another example, when one of the above modules is implemented by calling a program code through a processing element, the processing element may be a general purpose processor, such as a central processing unit (CPU) or another processor that can call the program code. For another example, these modules may be integrated and implemented in the form of system-on-a-chip (SOC).

In the above embodiments, it may be implemented in whole or in part by software, hardware, firmware or any combination thereof. When implemented in software, it can be implemented in whole or in part in the form of a computer program product. The computer program product includes at least one computer instructions. When the computer program instructions are loaded and executed on a computer, the processes or functions described according to embodiments of the present disclosure are generated in whole or in part. The computer may be a general purpose computer, a special purpose computer, a computer network, or other programmable apparatuses. The computer instructions may be stored in or transmitted from one computer-readable storage medium to another. For example, the computer instructions may be transmitted from one Web site, computer, server, or data center via wired (e.g. coaxial cable, optical fiber, digital subscriber line (DSL)) or wireless (e.g. infrared, wireless, microwave, etc.) mode to another Web site, computer, server, or data center. The computer-readable storage medium may be any available medium accessible to a computer or a data storage device such as a server, data center, or the like that contains at least one available media integration. The available media may be magnetic media (e.g. floppy disk, hard disk, magnetic tape), optical media (e.g. DVD), or semiconductor media (e.g. solid state disk (SSD)), etc.

Figure 12:
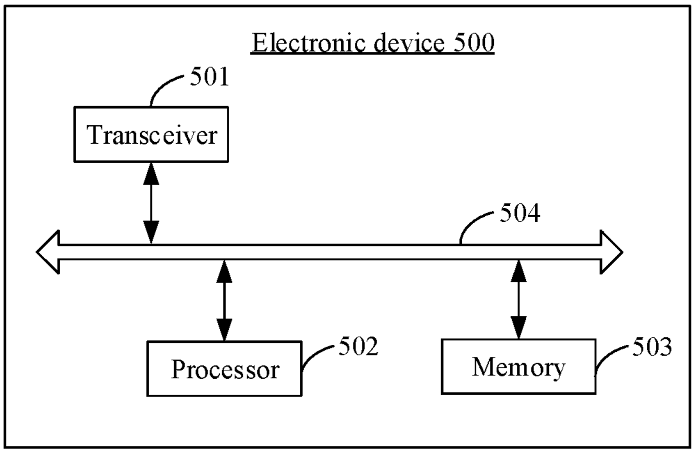
FIG. 12 is a schematic diagram of a hardware structure of an electronic device according to an embodiment of the present disclosure.

FIG. 12 is a schematic diagram of a hardware structure of an electronic device according to an embodiment of the present disclosure. As illustrated in FIG. 12, the electronic device 500 provided by the present embodiment includes: a transceiver 501, a processor 502, and a memory 503.

The memory 503 stores computer-executable instructions.

The processor 502 executes the computer-executable instructions stored in the memory 503, causing the processor 502 to execute the technical solutions of the first device as in any of the aforementioned method embodiments.

Optionally, the memory 503 may be either independent or integrated with the processor 502. When the memory 503 is a device independent of the processor 502, the electronic device 500 may further include: a bus 504 used for connecting the memory 503 and the processor 502.

Optionally, the processor 502 may be a chip.

Embodiments of the present disclosure also provide a computer-readable storage medium, and the computer-readable storage medium stores computer-executable instructions. The computer-executable instructions, when executed by the processor, are used to implement the technical solution of the first device in any of the aforementioned method embodiments.

Embodiments of the present disclosure also provide a computer program. The computer program, when executed by the processor, is used to execute the technical solution of the first device in any of the aforementioned method embodiments.

Embodiments of the present disclosure also provide a computer program product, which includes program instructions. The program instructions are used to implement the technical solution of the first device in any of the aforementioned method embodiments.

Embodiments of the present disclosure also provide a chip, which includes a processing module and a communication interface. The processing module can execute the technical solution of the first device in the aforementioned method embodiments.

Optionally, the chip further includes a memory module (e.g., a memory) for storing instructions. The processing module is used to execute the instructions stored in the memory module, and execution of the instructions stored in the memory module causes the processing module to execute the technical solution of the first device in any of the aforementioned method embodiments.

Embodiments of the present disclosure provide a method and apparatus for indicating resource collision, a device, and a storage medium, which can be applied to the field of sidelink communications. The indication method includes: by determining whether a resource collision occurs on a resource already used by a second device and/or whether a resource collision is likely to occur on a resource to be used by the second device, a first device decides whether to send first information for indicating resource collision to the second device. By means of the method, the second device is assisted in performing corresponding retransmission or resource reselection, and resource collisions of sidelink communication are reduced, thereby improving the reliability of sidelink data transmission.

In the present application, "at least two" means two or more, and "multiple" means two or more than two. "And/or", which describes the association relationship of the associated objects, means that there may be three relationships, for example, A and/or B, may mean that there is a single A, there are both A and B, and there is a single B, where A and B may be singular or plural. The character "/" generally means that the associated objects are a kind of "or" relationship. In the formula, the character "/" means that the associated objects are a "division" relationship. "At least one of the following" or its similar expression refers to any combination of these items, including any combination of single items or plural items. For example, at least one of a, b, or c may mean: a, b, c, a-b, a-c, b-c, or a-b-c, where a, b, c may be single or multiple.

It can be understood that the various numerical numbers related in embodiments of the present disclosure are for the convenience of description only and are not intended to limit the scope of embodiments of the present disclosure.

It can be understood that in embodiments of the present disclosure, the size of the sequence number of the above processes does not mean the order of execution, and the execution order of each process should be determined according to its function and inherent logic, and should not constitute any limitation on the implementation process of embodiments of the present disclosure.

What is claimed is:

1. A method for indicating resource collision, comprising:

determining, by a first device, whether to send first information, where the first information indicates that a resource collision is likely to occur on a resource to be used by a second device;

wherein the first information comprises third information, and the third information indicates that the resource collision is likely to occur on the resource to be used by the second device; and wherein a time domain position of the third information is in a slot m-b, wherein m represents a slot in which a next resource for transmission of a same transmission block (TB) reserved by first-stage sidelink control information (SCI) sent by the second device is located, and b represents a time for the second device to receive a physical sidelink feedback channel (PSFCH), process the PSFCH and prepare for sidelink retransmission.

2. The method of claim 1, wherein the first information is carried on the PSFCH.

3. The method of claim 1, wherein the first information comprises the third information; and wherein determining, by the first device, whether to send the first information comprises:

in response to satisfying a second condition, determining, by the first device, to send the third information, wherein the second condition comprises that the resource collision is likely to occur on the resource to be used by the second device.

4. The method of claim 1, wherein the time domain position of the third information is the same as a time domain position of a PSFCH carrying a hybrid automatic retransmission request (HARQ) feedback of a physical sidelink shared channel (PSSCH) transmitted by the second device in a slot n.

5. The method of claim 1, wherein a frequency domain position of the third information is different from a frequency domain position of a PSFCH carrying a hybrid automatic retransmission request (HARQ) feedback of a physical sidelink shared channel (PSSCH) transmitted by the second device in the slot n.

6. The method of claim 1, wherein the third information comprises at least one PSFCH sequence, each PSFCH sequence indicative of at least one of the following:

whether a resource collision occurs on a resource reserved by the second device; or whether a resource collision occurs on a next resource for a same TB retransmission reserved by the second device.

7. A device for indicating resource collision, comprising:

a processor, configured to determine whether to send first information through a transceiver, where the first information indicates that a resource collision is likely to occur on a resource to be used by a second device;

wherein the first information comprises third information, and the third information indicates that the resource collision is likely to occur on the resource to be used by the second device; and wherein a time domain position of the third information is in a slot m-b, wherein m represents a slot in which a next resource for transmission of a same transmission block (TB) reserved by first-stage sidelink control information (SCI) sent by the second device is located, and b represents a time for the second device to receive a physical sidelink feedback channel (PSFCH), process the PSFCH and prepare for sidelink retransmission.

8. The device of claim 7, wherein the first information is carried on the PSFCH.

9. The device of claim 7, wherein the first information comprises the third information; and wherein the processor is specifically configured to:

in response to satisfying a second condition, determine to send the third information through the transceiver, wherein the second condition comprises that the resource collision is likely to occur on the resource to be used by the second device.

10. The device of claim 7, wherein the time domain position of the third information is the same as a time domain position of a PSFCH carrying a hybrid automatic retransmission request (HARQ) feedback of a physical sidelink shared channel (PSSCH) transmitted by the second device in a slot n.

11. The device of claim 7, wherein a frequency domain position of the third information is different from a frequency domain position of a PSFCH carrying a hybrid automatic retransmission request (HARQ) feedback of a physical sidelink shared channel (PSSCH) transmitted by the second device in the slot n.

12. The device of claim 7, wherein the third information comprises at least one PSFCH sequence, each PSFCH sequence indicative of at least one of the following:

whether a resource collision occurs on a resource reserved by the second device; or whether a resource collision occurs on a next resource for a same TB retransmission reserved by the second device.

13. A non-transitory computer readable storage medium having stored therein a computer program that, when executed by a processor, causes the processor to perform operations comprising:

determining, by a first device comprising the processor whether to send first information, where the first information indicates that a resource collision is likely to occur on a resource to be used by a second device;

wherein the first information comprises third information, and the third information indicates that the resource collision is likely to occur on the resource to be used by the second device; and wherein a time domain position of the third information is in a slot m-b, wherein m represents a slot in which a next resource for transmission of a same transmission block (TB) reserved by first-stage sidelink control information (SCI) sent by the second device is located, and b represents a time for the second device to receive a physical sidelink feedback channel (PSFCH), process the PSFCH and prepare for sidelink retransmission.

14. The non-transitory computer readable storage medium of claim 13, wherein the first information is carried on the PSFCH.

15. The non-transitory computer readable storage medium of claim 13, wherein the first information comprises the third information; and wherein the processor is further configured to perform operations comprising:

in response to satisfying a second condition, determining, by the first device comprising the processor to send the third information, wherein the second condition comprises that the resource collision is likely to occur on the resource to be used by the second device.

16. The non-transitory computer readable storage medium of claim 13, wherein the time domain position of the third information is the same as a time domain position of a PSFCH carrying a hybrid automatic retransmission request (HARQ) feedback of a physical sidelink shared channel (PSSCH) transmitted by the second device in a slot n.

17. The non-transitory computer readable storage medium of claim 13, wherein a frequency domain position of the third information is different from a frequency domain position of a PSFCH carrying a hybrid automatic retransmission request (HARQ) feedback of a physical sidelink shared channel (PSSCH) transmitted by the second device in the slot n.

18. The non-transitory computer readable storage medium of claim 13, wherein the third information comprises at least one PSFCH sequence, each PSFCH sequence indicative of at least one of the following:

whether a resource collision occurs on a resource reserved by the second device; or whether a resource collision occurs on a next resource for a same TB retransmission reserved by the second device.

* * * * *